United States Patent [19]

Jabarin

[11] Patent Number: 4,567,069

[45] Date of Patent: Jan. 28, 1986

[54] MULTILAYER CONTAINERS WITH IMPROVED STRESS CRACK PROPERTIES

[75] Inventor: Saleh A. Jabarin, Holland, Ohio

[73] Assignee: Owens-Illinois, Inc., Toledo, Ohio

[21] Appl. No.: 621,352

[22] Filed: Jun. 18, 1984

[51] Int. Cl.$^4$ .................... B65D 23/00; B32B 27/08
[52] U.S. Cl. .................................. 428/35; 428/218; 428/515; 428/516
[58] Field of Search ............... 428/35, 515, 516, 218

[56] References Cited

U.S. PATENT DOCUMENTS

| | | | |
|---|---|---|---|
| 4,357,191 | 11/1982 | Bullard et al. | 428/35 |
| 4,397,916 | 8/1983 | Nagano | 428/35 |
| 4,418,841 | 12/1983 | Eckstein | 428/36 |
| 4,429,079 | 1/1984 | Shibata et al. | 428/35 |

FOREIGN PATENT DOCUMENTS

| | | | |
|---|---|---|---|
| 0050455 | 4/1982 | European Pat. Off. | 428/516 |
| 0021857 | 2/1981 | Japan | 428/515 |

*Primary Examiner*—John E. Kittle
*Assistant Examiner*—James J. Seidleck
*Attorney, Agent, or Firm*—Philip M. Rice

[57] ABSTRACT

Blow molded polymeric containers having good physical properties and good resistance to environmental stress cracking are provided. The walls and bottom of the containers are fabricated from a multilayer polymeric material. A thin inner wall is fabricated from a linear low density ethylene polymer. The thicker outer wall is fabricated from a linear high density ethylene polymer. The containers are well suited for packaging aqueous detergent products.

21 Claims, 4 Drawing Figures

MULTILAYER CONTAINERS WITH IMPROVED STRESS CRACK PROPERTIES

BACKGROUND OF THE INVENTION

Containers blow molded from linear high density ethylene polymers are easily fabricated at modest cost and have received wide public acceptance as containers for many types of liquid products, including distilled water, aqueous hypochlorite bleaches, vinegars, cooking oils, lubricating oils and the like. Such containers also have been used for packaging of certain types of liquid detergent products. The use of such containers to package liquid detergent products has been somewhat restricted, however, by reason of the fact that many types of liquid detergent products accelerate the tendency of the container to exhibit stress cracking. Stress cracking is evidenced by the appearance of hazy cracks in the container which are aesthetically unpleasing to the ultimate consumer. In extreme cases, stress cracking can lead to leakage of the contents from the container. The stress crack resistance of linear high density ethylene resins can be improved by blending such resins with other polymers such as butyl rubber, ethylene propylene copolymer rubbers and the like. The resulting blends, however, have reduced strength and stiffness and are not suitable for many packaging applications.

Containers thermoformed (e.g., vacuum formed) from linear high density ethylene polymer sheets also are subject to stress cracking when employed to package certain liquid and solid products, including margarines.

For the above reasons, there is a need in the art for liquid-tight containers fabricated from linear high density ethylene polymers and which have improved resistance to environmental stress cracking. In addition to improved environmental stress crack resistance, such containers will be required to maintain to a substantial degree the desirable physical properties of currently employed blow molded and thermoformed containers prepared from linear high density ethylene polymers.

SUMMARY OF THE INVENTION

The present invention provides liquid-tight containers for use in the packing of solid and liquid products, which containers have materially superior resistance to environmental stress cracking as compared with like containers fabricated from linear high density ethylene polymers. The containers of the inventions also have certain physical properties which are superior to those of like containers fabricated from linear high density ethylene polymers. The containers of the invention are fabricated from a multilayer polymeric material in which the inner layer is a relatively thin layer of a linear low density ethylene polymer and the principal layer is a relatively thick layer of a linear high density ethylene polymer.

DETAILED DESCRIPTION OF THE INVENTION

Figure 1:
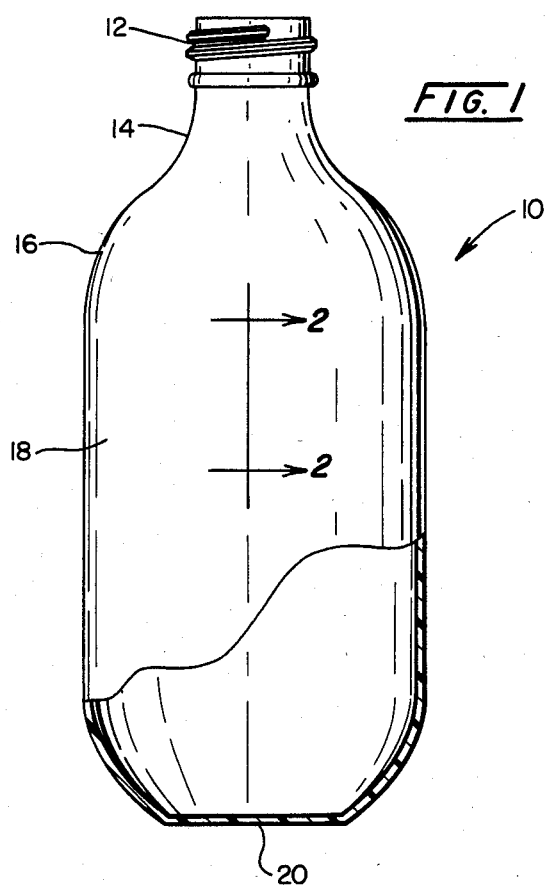
FIG. 1 is a front elevation, partially in section, of a blow molded threaded top container fabricated from a bilayered polymeric material.

The multilayered polymeric material from which the containers are fabricated customarily will contain two layers, but for special applications may contain three or more layers. The inner layer of linear low density ethylene polymer will be thin and ordinarily will constitute not more than about 40%, preferably less than about 20%, and more especially less than about 15% of the thickness of the multilayer polymeric material. The principal layer of linear high density ethylene material will constitute at least about 60%, preferably more than about 80%, and more especially more than about 85% of the thickness of the multilayer polymeric material. Where additional layers of other polymeric materials are included in the multilayer polymeric material, they will constitute less than about 10% and preferably less than about 5% of the thickness of the multilayer polymeric material. When such additional layers are included in the multilayer polymeric material, they may constitute the outer layer of the structure or may be positioned intermediate of the linear low density ethylene polymer and the linear high density ethylene polymer. Where such additional polymeric layers are included, they ordinarily are included to improve the barrier properties of the container, or to improve the printability of the container's exterior surface, or to improve the extrusion characteristics of the multilayer polymeric material.

The multilayered polymeric materials employed in the invention customarily will be prepared by coextrusion techniques known in the art. To prepare blow molded containers, a parison containing the low density ethylene polymer on its interior surface will be extruded through an annular die and then blow molded. Heavy sheet used to thermoform tubs and like containers ordinarily will be coextruded using flat sheet dies.

The linear high density ethylene polymer(s) included in the principal layer of the multilayer polymeric material will have a density of at least about 0.94 gm/ml. It is preferred to employ ethylene polymers having densities of at least about 0.95 and more especially at least about 0.96 gm/ml as containers prepared from such resins have greater stiffness. For this reason, somewhat thinner containers can be employed with no loss of stiffness. The high density ethylene polymers should have a relatively high molecular weight as indirectly measured by melt index values. The melt index should be less than abut 5.0 gm/10 min., and preferably less than about 1.0 gm/10 min. and more especially less than about 0.5 gm/10 min. as measured by ASTM Method 1238-70, Condition E. Mixtures of two or more such high density polymers may be employed if desired.

The linear high density ethylene polymers employed in the invention will have polymerized therein at least about 98 mol % ethylene with any comonomer polymerized therein being an alpha-monoolefin containing about 3 to 12 carbon atoms. Such linear high density ethylene polymers are known and reported in the art and are commercially available from numerous commercial producers. Such linear high density ethylene polymers are prepared by polymerizing ethylene, optionally in the presence of an alpha-monoolefin comonomer containing 3 to 12 carbon atoms, in the presence of certain metallic catalysts such as chromium catalysts, e.g., $CrO_3$ supported on silica-alumina supports, and the Ziegler-Natta catalysts, e.g., $TiCl_3$ employed in conjunction with certain aluminum alkyl cocatalysts. The requisite density and melt index desired in the polymer are obtained by proper control of polymerization conditions including temperature, pressure, comonomer concentration and the concentration of telogenating agents such as hydrogen.

The linear low density ethylene polymer(s) included in the inner layer of the multilayer polymeric material will have a density of less than about 0.94 gm/ml, preferably in a range of about 0.91 about 0.93 gm/ml, and more especially in a range of about 0.91 to about 0.92 gm/ml. The linear, low density ethylene polymers will have a melt index of less than about 10.0 and preferably less than about 5.0 and, more especially, less than about 1.0 gm/10 min., as measured by ASTM method 1238-70, Condition E. It is desirable for the melt index to be close to the melt index of the linear high density ethylene polymer included in the multilayer polymeric material to facilitate the fabrication of such material by coextrusion methods. These polymers are ethyene copolymers having polymerized about 2–6 and preferably about 4–6 mol % of an alpha-monoolefin containing about 3 to 12 carbon atoms with the balance of the monomer polymerized therein being ethylene. The linear low density ethylene polymers employed in the present invention have long linear chains with controlled numbers of relatively short chain branches attached to the linear chains along their entire length. These side chains, or "branches", are short and will contain from about 1 to 10 carbon atoms depending upon the particular alpha-monoolefin employed in the preparation of the polymer. The linear low density ethylene polymers differ structurally from low density ethylene polymers made by high pressure, free radical initiated polymerizations in having few, if any, long chain branches.

The linear low density ethylene polymers are commerically available from multiple commercial sources. Such polymers are prepared by copolymerizing ethylene with an alpha-monoolefin containing about 3 to 12 carbon atoms in the presence of certain metallic catalysts of the same general type employed to prepare the linear high density ethylene polymers discussed supra. The polymerization conditions employed in their preparation differ somewhat, and somewhat modified catalysts will be employed. One of the techniques to prepare such polymers involves copolymerizing ethylene and butene-1 in the vapor phase in a fluidized bed process. By reason of the constraints imposed by carrying out the polymerization in the vapor phase, the ethylene polymers prepared by this process are limited to copolymers of ethylene and butene-1. By operating in solvent systems, copolymers can be prepared from alpha-monoolefin comonomers containing up to 12 carbon atoms. The preferred linear low density ethylene polymers for inclusion in the blends of the invention will be ethylene copolymers having polymerized therein at least one alpha-monoolefin comonomer containing 6 to 12 carbon atoms, and which optionally also will have butene-1 copolymerized therein.

Where additional layers of polymers are employed in the containers of the invention, they will be employed to provide specific desired properties in the container. The additional layer can be provided on the outer surface of the container to improve surface glass and/or "printability". Ethylene copolymers having polymerized therein a polar comonomer, such as acrylic acid, are useful for this purpose. The additional layer also can be included to reduce the container's vapor transmission properties. Polymers having low vapor transmission properties are known in the art.

In preparation of containers of the invention, it is preferred to employ a single species of the linear high density ethylene polymer and a single species of the linear low density ethylene polymer. In the preparation of blow molded containers, as is known in the art, a certain percentage of trim material is recovered and must be recycled to achieve low manufacturing costs. The trim scrap is collected and comminuted to small particles to prepare a recycle material which is referred to as "regrind". Since the "regrind" will consist predominantly of a linear high density ethylene polymer, reasonable quantities of "regrind" can be blended with virgin linear high density ethylene polymer without significantly adversely affecting the strength properties of the containers.

Each of the ethylene polymers employed in the containers of the invention may contain minor amounts of other components conventionally employed with ethylene polymers. Specifically, the ethylene polymers can contain antioxidants, stabilizers, pigments, fillers, colorants and the like conventionally employed in such polymers to serve their customary function. Significant concentrations of low cost inorganic pigments, such as calcium carbonate, can be included, either alone or in admixture with other colorants, in the linear high density ethylene polymer both to provide opacity and/or color in the container and to reduce the container's cost.

Figure 2:
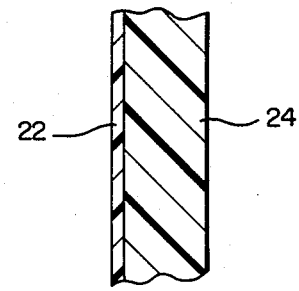
FIG. 2 is a sectional view of the bilayer wall of the container of FIG. 1 taken through line 2.2 of FIG. 1 and shown on an enlarged scale.
Figure 3:
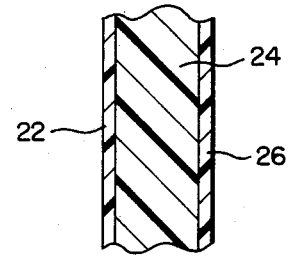
FIG. 3 is a view similar to FIG. 2 showing an alternate trilayer polymeric material that can be employed in the fabrication of the wall and bottom of a container as shown in FIG. 1.

FIG. 1 illustrates a bottle-type container 10 which includes a threaded finish portion 12, a neck portion 14, a shoulder portion 16, a main body portion 18 and a bottom portion 20. Each of the neck portion, the shoulder portion, the main body portion and the bottom portion is fabricated from a bilayer polymeric material. As shown in FIG. 2, the bilayer polymeric material includes a thin inner layer 22, which constitutes about 10% of the thickness of the wall and is a linear low density ethylene polymer and an outer layer 24, which constitutes about 90% of the thickness of the wall and is a linear high density ethylene polymer. FIG. 3 illustrates a trilayer polymeric material that can be employed in fabricating a container of the type shown in FIG. 1. Layers 22 and 24 are as previously described with the outer layer 26 being a very thin layer of an ionomer resin to provide improved barrier and printing properties. Layer 22 and 26 each constitute about 10% of the structure with layer 24 constituting about 80% of the structure.

Figure 4:
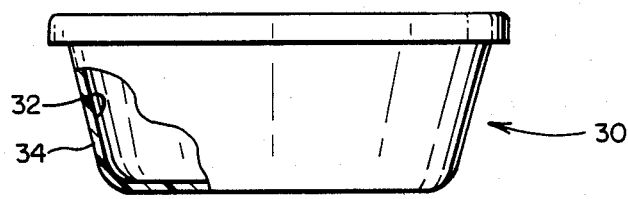
FIG. 4 is an elevation, partially in section, of a thermoformed tub-shaped container fabricated from a bilayered polymeric material.

FIG. 4 illustrates a thermoformed tub-shaped container 30 of the type employed to package margarine. The walls and bottom are fabricated from a bilayer polymeric material, including a thin layer 32 which constitutes about 10% of the wall's thickness and is a linear low density ethylene polymer and an outer layer 34, which constitutes about 90% of the wall's thickness and is a linear high density ethylene polymer.

The following examples are set forth to illustrate more clearly the principle and practice of the invention to those skilled in the art. Reported melt index values were determined by ASTM method 1238-70, Condition E.

EXAMPLE 1

Part A

As a first run to demonstrate the principle of the invention, containers of oval cross-section having a 28 oz. capacity and used to package Parson's brand ammonia were prepared employing a single cavity extrusion blow molding machine. Each container weighed about 50 grams.

Bilayer parisons were prepared on a Bekum BMO-I blow molding machine equipped with a Kautex coextrusion head. The die had an annular diameter of 0.740 inch. The die gap opening was set at 0.25 inch. A linear low density ethylene polymer having a density of 0.935 gm/ml and a melt index of 1.0 gm/10 min. was employed to form the inner wall of the parison. This polymer was fed to the die head by a 1¼ inch Welex extruder operated at a screw speed of 25 rpm with the melt temperature being maintained at 445° F. (229° C.). A linear high density ethylene polymer having a density of 0.953 gm/ml and a melt index of 0.25 gm/10 min. was employed to form the outer wall of the parison. This polymer was fed to the die by a 1¼ inch Welex extruder operated at a screw speed of 50 rpm with the melt temperature being maintained at 460° F. (238° C.). Each extruder had an L/D ratio of 24/1. The inner wall of the parison constituted about 33% of the total parison thickness.

Part B

As a control, otherwise identical containers wre prepared solely from the linear high density ethylene polymer employed in Part A.

Part C

Five of the blow molded containers of the invention prepared in Part A and five of the prior art containers prepared in Part B were tested for environmental stress crack resistance employing an unusually severe test procedure. In the test, each of the containers was filled with about three fluid ounces of an aqueous dishwashing product containing an anionic sulfonate surfactant. The containers were sealed and maintained at 140° F. The filled containers were examined on a daily basis for the first visible evidence of liquid leakage.

In the first nine days of the test, three of the five prior art control containers prepared in Part B failed the test and leaked. The test was continued for a total of 25 days. None of the containers of the invention prepared in Part A showed any evidence of leakage.

EXAMPLE 2

Part A

Containers of circular cross-section having a 16-oz. capacity were prepared employing a single cavity extrusion blow molding machine. Each container weighed about 23 grams.

Bilayer parisons were prepared on a modified Bekum BMO-1 blow molding machine equipped with a Kautex coextrusion head and 2 Welex 1¼ inch satellite extruders. The die had an annular opening of 0.575 inch. The die gap was set at 0.25 inch. A linear low density polyethylene resin having a density of 0.926 gm/ml and a melt index of 1.0 gm/10 min. was employed to form the inner wall of the parison. This polymer was fed to the die head by a 1¼ inch Welex extruder operated at a screw speed of 10 RPM with the melt temperature maintained at 460° F. A linear high density polyethylene resin having a density of 0.953 gm/ml and melt index of 0.25 gm/10 min. was employed to form the outer wall of the parison. This polymer was fed to the die by a 1¼ inch Welex extruder operated at a screw speed of 70 RPM with the melt temperature maintained at 460° F. Each extruder had an L/D ratio of 24/1. The inner wall of the parison constituted about 12% of the total thickness of the parison wall.

Part B

As a control, otherwise identical containers were prepared solely from the linear high density polyethylene resin employed in Part A.

Part C

Ten containers of the invention prepared in Part A and ten of the prior art containers prepared in Part B were subjected to a drop impact test. In the test, each container was filled to capacity with water and capped. Each container then was dropped on its bottom from a height of 4 feet. Each of the prior art containers cracked sufficiently so that water leakage was noted. None of the containers of the invention cracked in this test.

Part D

Test specimens were cut from center sections of the walls of the containers prepared in Parts A and B for measurement of physical properties by ASTM procedures. One set of specimens was cut in the vertical plane, i.e., along the axis of extrusion, while the second set was cut transversely thereto. Each specimen was tested for Elongation at Break (%) and Impact Energy Absorption (ft. lbs/in.$^2$). The results are shown in Table 1.

TABLE 1

| Sample Property | Product of Invention | Prior Art Control |
| --- | --- | --- |
| Elongation at Break, % | | |
| Vertical Specimen | 116 ± 17 | 60 ± 19 |
| Transverse Specimen | 75 ± 36 | 66 ± 14 |
| Impact Energy Absorption, ft. lbs/in.$^2$ | | |
| Vertical Specimen | 302 ± 41 | 192 ± 66 |
| Transverse Specimen | 199 ± 94 | 212 ± 60 |

It will be noted that the properties of the containers of the invention are materially superior to the properties of the prior art containers.

EXAMPLE 3

One gallon containers were prepared on a commercial blow molding machine. A bilayer parison was prepared in which the inner layer constituted 10% of the structure's thickness and was fabricated from a linear low density ethylene polymer having a density of 0.926 gm/ml and a melt index of 1.0 gm/10 min. The outer layer was fabricated from a linear high density ethylene polymer having density of 0.953 gm/ml and a melt index of 0.25 gm/10 min.

The molding machine employed in this example was one used to manufacture a one-handled, one gallon container used to package hypochlorite bleach. The extrusion rate of the bilayered parison was adjusted so that the container weights were equivalent to those of the prior art containers made routinely on the same equipment. The containers of the invention molded well at commercially acceptable rates and in appearance were indistinguishable from the prior art containers manufactured on the same molding machine.

While the articles herein described constitute preferred embodiments of the invention, it is to be understood that the invention is not limited to these articles and that changes may be made therein without departing from the scope of the invention which is defined in the appended claims.

What is claimed is:

1. A thermoformed or molded container whose walls are of sufficient thickness to be self-sustaining when used in the packaging of solid and liquid products which comprises a container whose bottom and side walls are fabricated from a multilayer polymeric material characterized in that (a) the inner layer of said multilayer material is relatively thin and constitutes not more than about 40% of the thickness of said multilayer material and is a linear low density ethylene polymer having a density of less than about 0.94 gm/ml and having polymerized therein about 2–6 mol % of an alpha-monoolefin containing about 3–12 carbons and the balance ethylene; and (b) the principal layer of said multilayer material is relatively thick and constitutes at least about 60% of the thickness of said multilayer material and is a linear high density ethylene polymer having a density of at least about 0.94 gm/ml, a melt index of less than about 5.0 gm/10 min. and having polymerized therein at least about 98 mol % ethylene with any comonomer polymerized therein being an alpha-monoolefin containing about 3 to 12 carbon atoms.

2. A container of claim 1 in which the inner layer of the multilayer polymeric material constitutes not more than about 20% of the thickness of said multilayer material.

3. A container of claim 2 in which the linear high density ethylene polymer has a melt index of less than about 1.0 gm/10 min.

4. A container of claim 3 in which the linear low density ethylene polymer is an ethylene polymer having polymerized therein an alpha-monoolefin containing 6 to 12 carbon atoms.

5. A container of claim 3 in which the linear high density ethylene polymer has a density of at least about 0.95 gm/ml.

6. A container of claim 1 in which the multilayer polymeric material contains a third layer of a polymeric material either intermediate of the inner layer and the principal layer or on the outer surface of the container, said third layer constituting less than 10% of the thickness of the multilayer polymeric material.

7. A container of claim 6 in which the third layer of polymeric material of the multilayer polymeric material is provided on the outer surface of the container to improve the container's gloss or printability.

8. A blow molded bottle-type container including a threaded container finish portion, a shoulder portion, a main body portion and a bottom portion, at least the shoulder portion, the main body portion, and the bottom portion of the container being fabricated from a multilayer polymeric material characterized in that (a) the inner layer of said multilayer material is relatively thin and constitutes not more than about 40% of the thickness of said multilayer material and is a linear low density ethylene polymer having a density of less than about 0.94 gm/ml and having polymerized therein about 2–6 mol % of an alpha-monoolefin containing about 3–12 carbons and the balance ethylene; and (b) the principal layer of said multilayer material is relatively thick and constitutes at least about 60% of the thickness of said multilayer material and is a linear high density ethylene polymer having a density of at least about 0.94 gm/ml, a melt index of less than about 5.0 gm/10 min. and having polymerized therein at least about 98 mol % ethylene with any comonomer polymerized therein being an alpha-monoolefin containing about 3 to 12 carbon atoms.

9. A container of claim 8 in which the inner layer of the multilayer polymeric material constitutes not more than about 20% of the thickness of said multilayer material.

10. A container of claim 9 in which the linear high density ethylene polymer has a melt index of less than about 1.0 gm/10 min.

11. A container of claim 9 in which the linear low density ethylene polymer is an ethylene polymer having polymerized therein an alpha-monoolefin containing 6 to 12 carbon atoms.

12. A container of claim 10 in which the linear high density ethylene polymer has a density of at least about 0.95 gm/ml.

13. A container of claim 8 in which the multilayer polymeric material contains a third layer of a polymeric material either intermediate of the inner layer and the principal layer or on the outer surface of the container, said third layer constituting less than 10% of the thickness of the multilayer polymeric material.

14. A container of claim 13 in which the third layer of polymeric material of the multilayer polymeric material is provided on the outer surface of the container to improve the container's gloss or printability.

15. A sealed blow molded bottle-type container having packaged therein an aqueous solution of a surfactant, said container including a threaded container finish portion, a shoulder portion, a main body portion, and a bottom portion, at least the shoulder portion, the main body portion and the bottom portion of the container being fabricated from a multilayer polymeric material characterized in that (a) the inner layer of said multilayer material is relatively thin and constitutes not more than about 40% of the thickness of said multilayer material and is a linear low density ehtylene polymer having a density of less than about 0.94 gm/ml and having polymerized therein about 2–6 mol % of an alpha-monoolefin containing about 3–12 carbons and the balance ethylene; and (b) the principal layer of said multilayer material is relatively thick and constitutes at least about 60% of the thickness of said multilayer material and is a linear high density ethylene polymer having a density of at least about 0.94 gm/ml, a melt index of less than about 5.0 gm/10 min. and having polymerized therein at least about 98 mol % ethylene with any comonomer polymerized therein being an alpha-monoolefin containing about 3 to 12 carbon atoms.

16. A container of claim 15 in which the inner layer of the multilayer polymeric material constitutes not more than about 20% of the thickness of said multilayer material.

17. A container of claim 16 in which the linear high density ethylene polymer has a melt index of less than about 1.0 gm/10 min.

18. A container of claim 17 in which the linear low density ethylene polymer is an ethylene polymer having polymerized therein an alpha-monoolefin containing 6 to 12 carbon atoms.

19. A container of claim 17 in which the linear high density ethylene polymer has a density of at least about 0.95 gm/ml.

20. A container of claim 15 in which the multilayer polymeric material contains a third layer of a polymeric material either intermediate of the inner layer and the principal layer or on the outer surface of the container, said third layer constituting less than 10% of the thickness of the multilayer polymeric material.

21. A container of claim 20 in which the third layer of polymeric material of the multilayer polymeric material is provided on the outer surface of the container to improve the container's gloss or printability.

* * * * *